United States Patent [19]

Campagnuolo et al.

[11] Patent Number: 5,444,262
[45] Date of Patent: Aug. 22, 1995

[54] THERMOELECTRIC DEVICE FOR VEHICLE IDENTIFICATION

[75] Inventors: Carl J. Campagnuolo, Potomac; Phil Emmerman, Bethesda; Stephen Kreider, Laurel, all of Md.

[73] Assignee: The United States of America as represented by the Secretary of the Army, Washington, D.C.

[21] Appl. No.: 170,961

[22] Filed: Dec. 21, 1993

[51] Int. Cl.⁶ .............................................. H01J 1/00
[52] U.S. Cl. .................................. 250/495.1; 250/493.1
[58] Field of Search .......................... 250/493.1, 495.1

[56] References Cited

U.S. PATENT DOCUMENTS

| | | |
|---|---|---|
| H, 820 | 9/1990 | Smoot . |
| Re. 33,287 | 8/1990 | Allen . |
| 3,797,395 | 3/1974 | Tyroler ............................ 250/493.1 |
| 4,087,687 | 5/1978 | Bean ................................ 250/331 |
| 4,240,212 | 12/1980 | Marshall et al. . |
| 4,337,044 | 6/1982 | Palmer . |
| 4,622,822 | 11/1986 | Beitner . |
| 4,946,171 | 8/1990 | Merle et al. ................... 250/495.1 |
| 5,057,815 | 10/1991 | Smoot et al. . |
| 5,062,586 | 11/1991 | Hobson et al. . |
| 5,065,032 | 11/1991 | Prosser ........................... 250/495.1 |
| 5,074,490 | 12/1992 | Muse et al. . |
| 5,265,958 | 11/1993 | Ladlow .......................... 250/495.1 |

Primary Examiner—Bruce C. Anderson
Attorney, Agent, or Firm—Freda L. Krosnick; Frank J. Dynda

[57] ABSTRACT

To provide a combat identification device not affected by adverse environmental conditions, thermoelectric modules are incorporated to a rotatable panel coupled to a target vehicle. By supplying the appropriate power to the thermoelectric modules, one surface of each thermoelectric module would exhibit coolness while the other surface of the module would exhibit heat. The panel to which the thermoelectric modules are incorporated therefore has a cold surface and a hot surface. And by rotating the panel, an identification signature is provided to an infra-red reviewer of an attacker to indicate that the vehicle to which the assembly of the instant invention is attached is a friendly vehicle. Instead of a single panel, two panels may be joined together in an inverted-V shape.

9 Claims, 4 Drawing Sheets

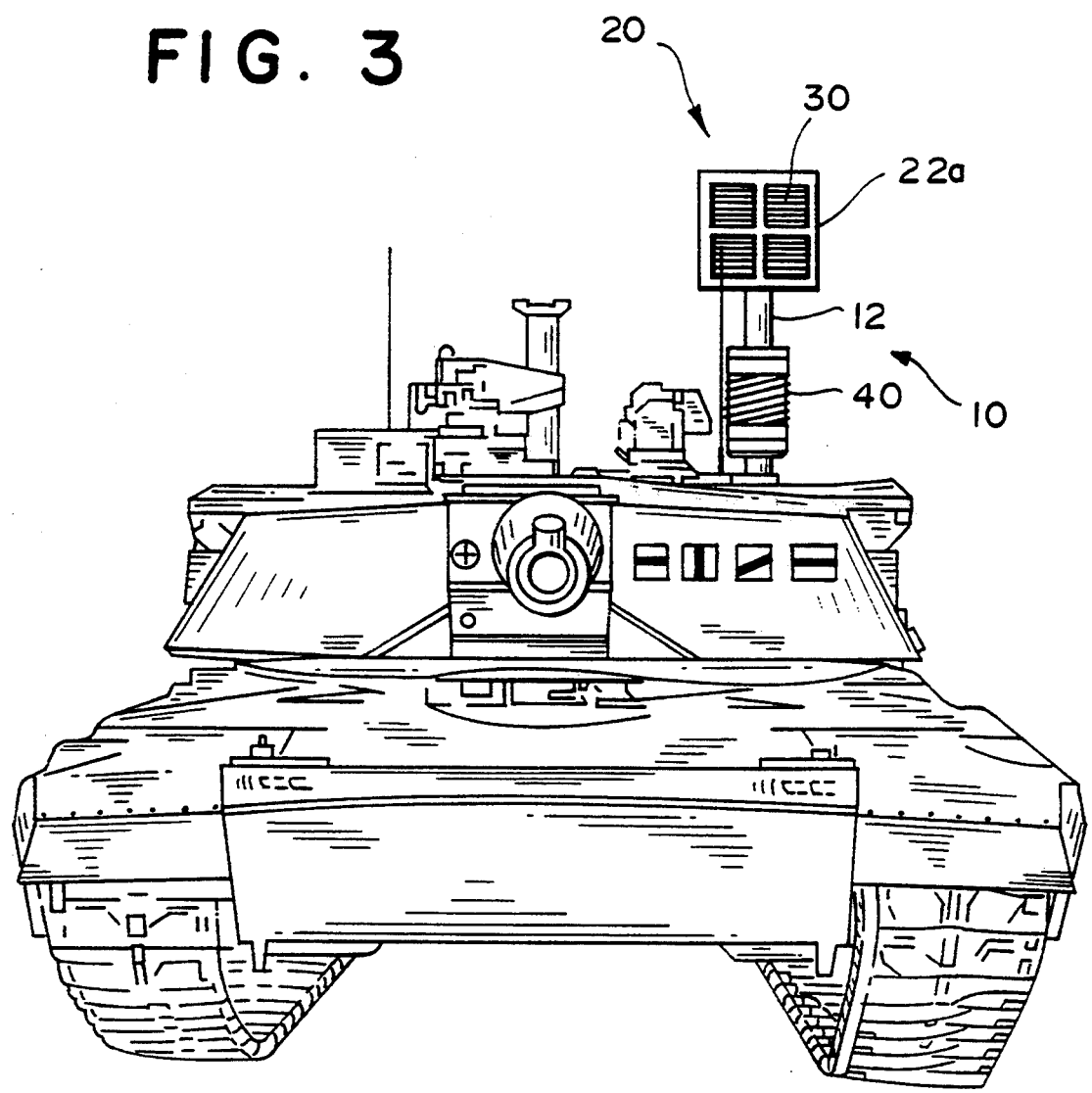

THERMOELECTRIC DEVICE FOR VEHICLE IDENTIFICATION

RIGHTS OF THE GOVERNMENT

The invention described herein may be manufactured, used and licensed by or for the United States Government for governmental purposes without payment to us of any royalty thereon.

FIELD OF THE INVENTION

The present invention relates to vehicle identification and more particularly to an apparatus and a method for providing identification to a vehicle involved in a combat environment.

BACKGROUND OF THE INVENTION

During the Gulf War many casualties were caused by fratricide, i.e. friendly troops shooting at and killing each other. The ability of recognizing friend from foe in a fast changing electronic warfare environment is therefore of the utmost importance. A method for identifying friend from foe is disclosed in a recently filed patent application entitled "Phosphorescent Light Panels—A Solution To The Fratricide Problem", by two of the co-inventors of the instant application.

To reduce casualties due to friendly fire, a positive identification may be provided by mounting a beacon to a vehicle.

A solution offered by the Night Vision and Electrical Optics Laboratory (NVEOL) of the Department of Army uses a thermal identification device. The device can be activated either remotely by a laser or from within the vehicle when positive identification is required. The thermal identification device consists of two plates joined together in an inverted-V shape on a roof. One of the plates is heated by a current passing through wires on the surface of the plate. The other plate is made of aluminum and reflects the temperature of the sky. The temperature difference between the two surfaces of the plates is a function of range, as the aluminum plate surface is susceptible to variations in the daily weather conditions, such as the time of day, the ambient temperature and cloud cover, etc. The thermal identification device is positioned on top of an aluminum tube having coupled thereto a motor and a slip ring, through which an appropriate voltage is applied to turn the motor.

Sometime in October 1992, there was issued by the National Training Center a requirement of a kill indicator for a vehicle (such as an M1 tank) to allow an attack helicopter to see that a tank has been struck by laser bullets. The present indicator on the M1 tank in use at the National Training Center is inadequate insofar as it consists of a Whoopee light that spins around on top of the tank when the tank's Multiple Integrated Laser Engagement System (MILES) registers a hit. This light is not visible to a helicopter pilot using a forward looking infra-red sensor (FLIR), i.e. the requirement further mandated that the kill indicator should function as a beacon and be visible under all weather conditions.

At first, the use of the thermal identification device as a solution to the problem became apparent. In other words, the thermal identification device can be connected with the Whoopee light so that when a MILES hit is scored, both the Whoopee light and the thermal identification device are activated. The temperature difference between the heated plate and the sky-reflecting plate would be observed by the helicopter's FLIR. The larger the temperature difference the further the visible distance. Unfortunately, the thermal identification device cannot beacon if the weather is cloudy, rainy or foggy.

There is therefore a need for a thermal identification device that is operational and visible under all weather conditions.

SUMMARY OF THE PRESENT INVENTION

To provide a device that is not dependent on weather conditions, the present invention thermal identification device (TID) utilizes a plurality of thermoelectric modules which, when supplied with a current, effect a temperature differential between its front and rear surfaces. Thus, by integrating at least one thermoelectric module to a panel and supplying the thermoelectric module with a current, one surface of the panel becomes hot while the other surface becomes cold. A set of fins, acting as a heat sink, coupled to the hot surface of the thermoelectric module provides heat dissipation for the module. Since the temperature differential for the thermoelectric module is not dependent on ambient conditions, a TID made with thermoelectric modules would provide a beacon in all types of weather.

An embodiment of the present invention provides for an inverted-V roof-like structure formed by two panels each having integrated therein a plurality of thermoelectric modules. The roof structure is mounted to a motor, which is secured to a vehicle by means of a support post. Fins may be added to the respective surfaces of the panel to which heat is generated by the thermoelectric modules. Each of the panels may have integrated thereto a number of the thermoelectric modules. However, the thermoelectric modules are integrated to the respective panels in such a way that one of the panels has the hot surfaces of the thermoelectric modules projecting outward while the other panel has the hot surfaces of the thermoelectric modules projecting inward. Thus, as the roof-like structure is spun by the motor, a signature comprising hot, cold, hot etc. displays is provided as a beacon to an infra-red viewer.

The thermal identification device of the present invention may be incorporated to a vehicle equipped with a laser detector so that, in a warfare environment, if the laser detector detects a friendly laser beam, the roof structure is activated to provide an indication to the attacker (which is equipped with a laser range finder) that the vehicle is a friendly vehicle, in order to prevent fratricide. The present invention may also be used in a field training environment in which the thermal identification device is incorporated to the vehicle to signify a hit when the vehicle is hit by a direct fire laser.

It is therefore an objective of the present invention to provide a thermal identification device whose operation is independent of environmental variations.

It is another objective of the present invention to provide a thermal identification device responsive to a laser beam to provide an indication of being a "friendly" vehicle.

It is yet another objective of the present invention to provide a thermal identification device that is responsive to a laser from a direct fire laser weapon to provide an indication that the vehicle has been hit during a field training exercise.

BRIEF DESCRIPTION OF THE FIGURES

The above-mentioned objectives and advantages of the present invention will become more apparent and the invention itself will be best understood by reference to the following description of the invention taken in conjunction with the accompanying drawings, wherein:

FIG. 3 is a drawing of a M1 tank having secured thereto the thermal identification system of the instant invention in which the hot side of the spinner roof structure is shown facing forward.

DETAILED DESCRIPTION OF THE PRESENT INVENTION

Figure 1:
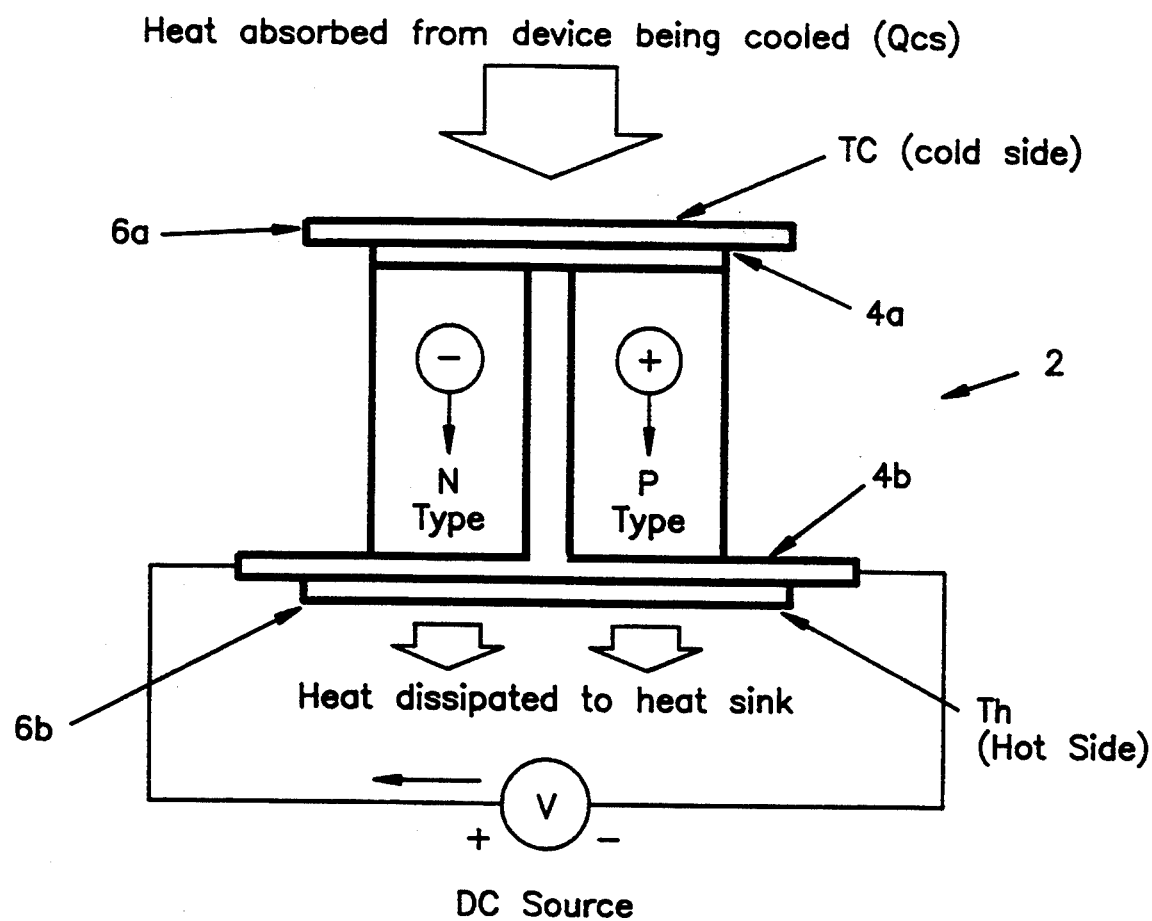
FIG. 1 is a simplified illustration of a thermoelectric module.

With reference to FIG. 1, the concept of heat movement with respect to a thermoelectric module is discussed. In brief, thermoelectric modules are small solid state heat pumps that range in size from a thumb-nail to over 2" square. These modules would cool, heat and generate power. They are similar to conventional refrigerators in that they move heat from one area to another, thus creating a temperature differential. These thermoelectric modules are manufactured by the Tellurex Corporation.

In particular, as shown in FIG. 1, a thermoelectric module 2 comprises two ceramic substrates sandwiching an array of semi-conductor couples (P and N pellets). The top ceramic substrate is formed by a metallization layer 4a and a top ceramic layer 6a. Similarly, the lower ceramic substrate is formed by a metallization layer 4b and a ceramic layer 6b. If a DC power source is connected to the thermoelectric module such as shown, heat is absorbed at one end (face or surface) of the device while rejected at the other end of the device. Thus, the face of the device where heat is absorbed becomes cool while the face where heat is rejected becomes hot. This is known as the Peltier effect. By reversing the current flow, the direction of the heat flow is reversed. Albeit not germane to the instant invention, the thermoelectric module can also generate power if a temperature gradient is maintained across the module and if the module is connected to an electrical load. This power generation aspect of the thermoelectric module is known as the Seebeck effect.

To rid the heat generated from the thermoelectric module, temperature conductive fins made from, for example aluminum, are attached to the "hot" face of the module such that while one face of the thermoelectric module is cold, its other face is hot.

Figures 2A, 2B:
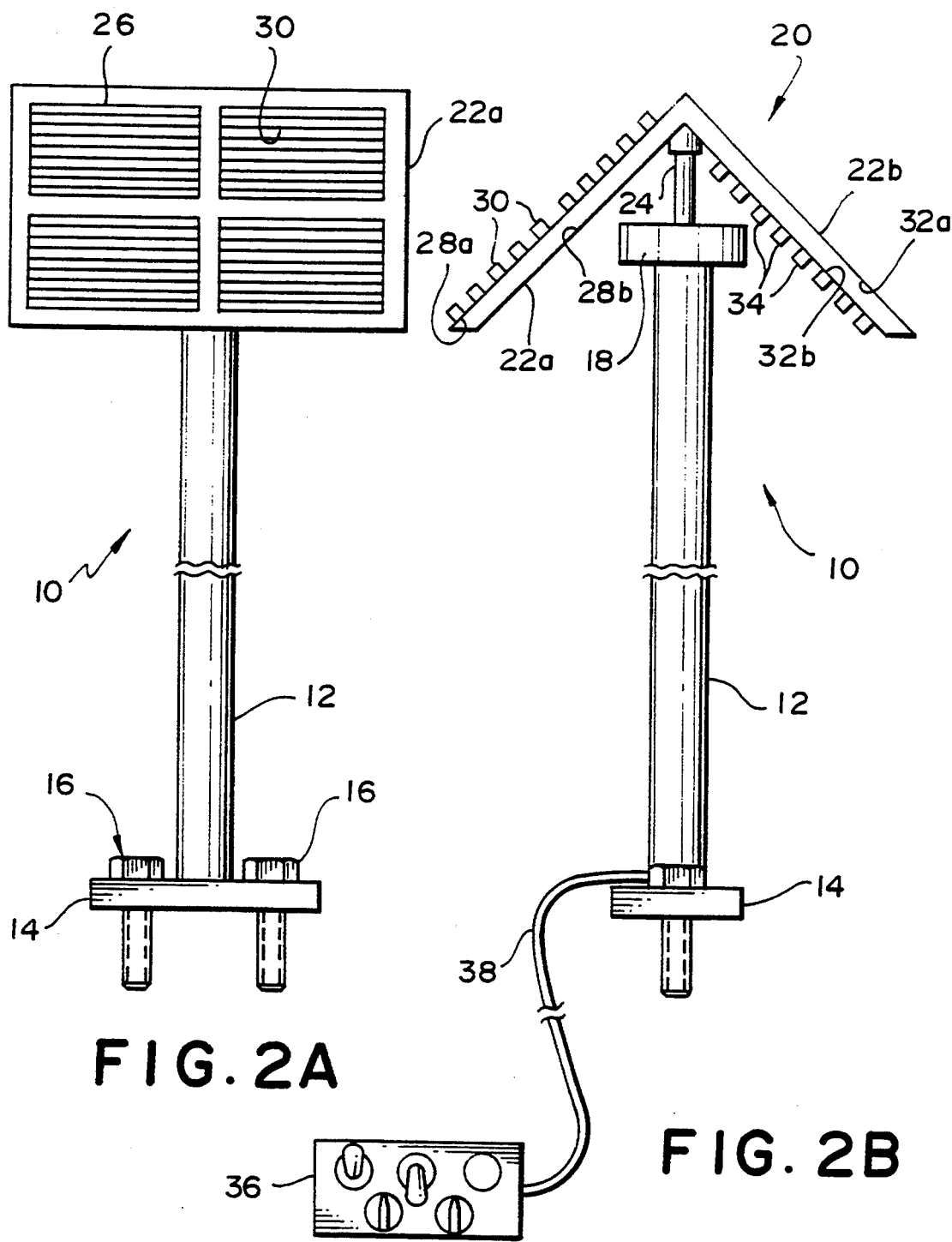
FIG. 2A is a frontal view of a spinner assembly and the identification panel having incorporated therein a number of thermoelectric modules such as that shown in FIG. 1.
FIG. 2B is a cross-sectional view of the FIG. 2A spinner assembly.

A spinner assembly of the present invention having incorporated therein a number of the thermoelectric modules is shown in FIGS. 2A & 2B. In particular, as shown in FIGS. 2A and 2B, the spinner assembly 10 is shown to comprise a post 12 having a base plate 14 to be secured to a vehicle by means of bolts 16. The vehicle may be the M1 tank shown in FIGS. 3 and 4. Or it could be any other vehicles that may be involved in a warfare environment or in a field training exercise. Further shown in FIG. 2B is a motor 18 mounted to the top of the post for spinning a roof-like structure 20 formed as an inverted V by two temperature conductive panels 22a and 22b. It should be noted that each panel can vary in size, shape or color and that support post 12 may be of variable length. Structure 20 is coupled to motor 18 by means of a shaft 24 coupled to the underside of its apex. It should further be noted that the two panel structure may be replaced by a single panel structure mounted on top of the post insofar as a single panel having incorporated thereinto the required thermoelectric modules (and the fins) does by itself have both hot and cold surfaces, per discussion below. Such single panel structure would of course be more viewable by other ground vehicles (as compared to aircraft) since it more than likely does not have a slant orientation.

For the embodiment shown in FIG. 2A, panel 22a is shown to be divided into four sections, each having incorporated therein a thermoelectric module 26 of FIG. 1. As should readily be apparent, the number of thermoelectric modules incorporated to panel 22 can vary.

With reference to FIG. 2B, for panel 22a the thermoelectric modules are integrated thereto with their "hot" faces being positioned along surface 28a of the panel. To dissipate the heat generated from the hot faces of the thermoelectric modules, fins 30 are provided on surface 28a of panel 22a. The thermoelectric modules integrated to panel 22b have their hot faces at surface 32b and their cold faces at surface 32a of panel 22b. To dissipate the heat at surface 32b, a set of fins 34, acting as heat sinks, is attached thereto. Panel 22a of structure 20 therefore has a hot outside surface 28a and a cold inside surface 28b, while panel 22b of structure 20 has a cool outside surface, 32a and a hot inside surface 32b.

As shown in FIG. 2B, power to motor 18 is provided from a control box 36 via lead 38. Control box can be manually operated to cause motor 18 to spin structure 20. Or motor 18 can be configured to spin only when a laser detector (not shown) located somewhere on the vehicle detects a laser beam from a laser emitter. In the case where the instant invention is used on a vehicle in a field exercise, when a laser beam is detected, motor 18 is activated to rotate structure 20 to thereby indicate either a hit or that the vehicle is a friendly vehicle that should not be fired at.

FIG. 3 shows a M1 tank that has the spinner assembly of the present invention incorporated thereto. Roof structure 20 is shown to have rotated to an orientation with fins 30 of panel 22a in a forward position. For the spinner assembly 10 shown in FIG. 3, a spring assembly 40 connects post 12 to the tank so that spinner assembly 10 can bend if it hits an immovable object. For the FIG. 3 tank, assembly 10 provides an identification beacon to an attacker (either an aircraft, helicopter or an another vehicle) equipped with an infra-red viewer.

Figure 4:
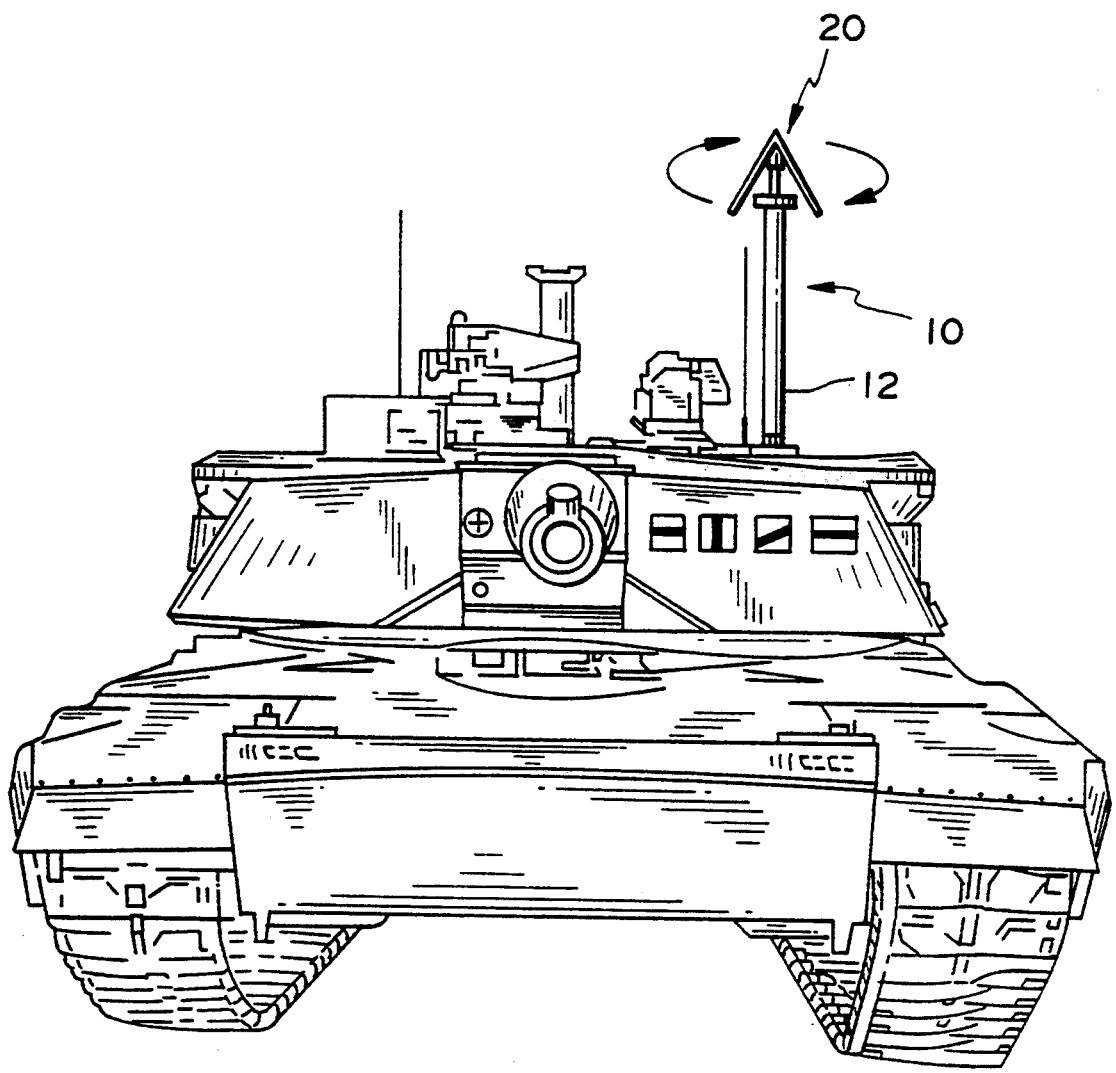
FIG. 4 is the same as FIG. 3 except that the spinner roof structure is shown to have spun to its side.

FIG. 4 shows a spinner assembly 10 mounted to a M1 tank by means of post 12. For the FIG. 4 illustration, roof structure 20 is shown to be spinning, or to have spun to a sideways orientation.

In operation, the spinner assembly of the instant invention can be used as a beacon to provide identification of a target to either an attacking aircraft or a ground vehicle. In the case where the spinner assembly works cooperatively with a laser detector, when an attacker illuminates or designates the target with a laser range finder, the target vehicle will respond with a signal, by spinning the panel(s) containing the thermoelectric modules to provide a signal to the attacker to indicate that the target is a friendly vehicle. For this instance, the thermoelectric device is powered on at all times, and the laser range finder merely triggers the motor to spin the panel(s).

In a warfare environment in which it is desirable to maintain a continuous indication that the vehicle is friendly, the motor is manually actuated so that the thermoelectric modules are constantly powered and the panel(s) spun continuously.

In the instance where the spinner assembly is used as a hit indicator, for example, in a field training exercise upon detection of a laser hit, as for example from a direct fire laser weapon, the motor is activated to spin the thermoelectric module panel to provide an indication that the vehicle is hit.

The thermoelectric modules may also be used to provide an identifying signature for the different types of vehicles. For example, a plurality of thermoelectric modules may be formed in a given pattern on a surface of a vehicle. In particular, the different modules may be powered by different currents so that some of the modules are activated to exhibit coolness, with reference to the surface of the vehicle, while the other modules are activated to heat. Given the particular pattern formed on the vehicle by the thermoelectric modules and the specific modules which exhibit coolness and heat, an attacker vehicle could readily ascertain that the vehicle is a specific type of vehicle, as for example a friendly M1 tank.

Inasmuch as the present invention is subject to many variations, modifications, and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. A beacon mounted on a vehicle to provide identification to an infra-red viewer, comprising:
   a rotatable support secured to said vehicle;
   at least one thermoelectric module integrated to at least one temperature conductive panel coupled to said support;
   a power source for supplying power to said module to cause said module to effect a temperature differential between a front and a back surface of said panel;
   wherein when identification of said vehicle is desired, said support is rotated to thereby rotate said panel to provide to said infra-red viewer an infra-red signature resulting from the rotating display of said front and back surfaces having different temperatures.

2. The beacon of claim 1, wherein said panel comprises a number of thermoelectric modules integrated thereto in a given configuration.

3. The beacon of claim 1, further comprising:
   fins attached to said panel and in temperature conductive contact with said module to provide a heat sink for said module;
   whereby the side of said panel where said fins are attached being the hot side of said panel.

4. A beacon on a vehicle to provide identification to an infra-red viewer, comprising:
   a rotatable support secured to said vehicle;
   two temperature conductive panels, each having a front and rear surface, fixed to each other in an inverted V configuration to provide a rooflike structure whereby both rear surfaces of said panels face each other, said roof-like structure being coupled to said support;
   at least two thermoelectric modules each integrated to a respective one of said panels;
   power source for supplying power to said modules to cause said modules to effect respective temperature differentials between their respective front and rear faces;
   wherein one of said modules provides a hotter temperature to the front surface of its corresponding panel while the other of said modules effects a hotter temperature to the rear surface of its corresponding panel;
   wherein when identification of said vehicle is desired, said support is rotated to spin said roof-like structure to provide a signature visible to said infra-red viewer.

5. The beacon of claim 4, wherein each of said panels comprises a plurality of thermoelectric modules integrated thereto.

6. The beacon of claim 4, further comprising:
   temperature conductive fins attached to the surface of the respective panels where said corresponding modules have the hotter temperature to provide respective heat sinks for said modules, the outside facing surface of the panel of the roof-like structure having said fins attached thereto being the hot side of said roof-like structure.

7. Apparatus to enable a vehicle to provide combat identification to an attacker having an infra-red viewer and a laser emitter, comprising:
   a rotatable support secured to said vehicle;
   a motor to rotate said support;
   at least one thermoelectric module integrated to at least one temperature conductive panel coupled to said support;
   power source for supplying power to said module to cause said module to effect a temperature differential between the front and back surfaces of said panel;
   laser detect device electrically coupled to said motor to activate the same when a laser beam is detected;
   wherein when said attacker targets said vehicle with a laser beam from said laser emitter, said laser detect device activates said motor to rotate said support to thereby spin said panel to provide a signal to said attacker.

8. Apparatus of claim 7, wherein said laser emitter of said attacker comprises a laser range finder; and
   wherein when said laser beam hits said vehicle, said panel is spun to provide an indication to said attacker that said vehicle is a friendly vehicle.

9. Apparatus of claim 7, wherein said laser emitter of said attacker comprises a direct fire laser; and
   wherein when said laser hits said vehicle, said panel is spun to provide a hit indication to said attacker.

* * * * *